(12) United States Patent
Hayasaka (10) Patent No.: US 7,423,667 B2
(45) Date of Patent: Sep. 9, 2008

(54) IMAGE PICKUP DEVICE WITH IMAGE MASKING

(75) Inventor: Ikumi Hayasaka, Kanagawa (JP)

(73) Assignee: Sony Corporation, Tokyo (JP)

( * ) Notice: Subject to any disclaimer, the term of this patent is extended or adjusted under 35 U.S.C. 154(b) by 655 days.

(21) Appl. No.: 10/943,859

(22) Filed: Sep. 20, 2004

(65) Prior Publication Data

US 2005/0068437 A1 Mar. 31, 2005

(30) Foreign Application Priority Data

Sep. 29, 2003 (JP) ............................... 2003-338383

(51) Int. Cl.
*H04N 7/18* (2006.01)
*H04N 9/47* (2006.01)

(52) U.S. Cl. ...................................................... 348/143

(58) Field of Classification Search ................ 348/143, 348/231.99, 231.3, 231.6
See application file for complete search history.

(56) References Cited

U.S. PATENT DOCUMENTS

| 4,743,975 | A | * | 5/1988 | Ijuin ........................... 358/404 |
| 5,808,670 | A | * | 9/1998 | Oyashiki et al. ............. 348/143 |
| 6,509,926 | B1 | * | 1/2003 | Mills et al. .................. 348/143 |
| 6,744,461 | B1 | * | 6/2004 | Wada et al. .................. 348/143 |
| 2001/0024233 | A1 | * | 9/2001 | Urisaka et al. .............. 348/213 |
| 2003/0137589 | A1 | | 7/2003 | Miyata |
| 2003/0227555 | A1 | * | 12/2003 | Kobayashi et al. ........ 348/231.6 |
| 2004/0036767 | A1 | * | 2/2004 | Yajima ........................ 348/143 |

FOREIGN PATENT DOCUMENTS

| EP | 0 729 275 A2 | 8/1996 |
| EP | 1 081 955 A2 | 3/2001 |
| EP | 1 280 117 A1 | 1/2003 |
| JP | 10-191306 | 7/1998 |
| JP | 2001-69494 | 3/2001 |
| JP | 2003-61076 | 2/2003 |

* cited by examiner

*Primary Examiner*—Lin Ye
*Assistant Examiner*—Jason Whipkey
(74) *Attorney, Agent, or Firm*—Oblon, Spivak, McClelland, Maier & Neustadt, P.C.

(57) ABSTRACT

An image obtained on imaging is correlated with the information pertinent to a privacy mask, designed to shield an image obtained on imaging, for convenience in image recording processing by an external device, including a downstream side image recording device, first and foremost. An image shielding area for shielding the image of an object on an output image surface is generated, based on a control signal transmitted from an image recording system 2. This image shielding area is synthesized to the image of the object so that the image shielding area is prioritized over the image of the object. The synthesized image is correlated with the information pertinent to the image shielding area and sent to the image recording system 2.

6 Claims, 6 Drawing Sheets

: PRIVACY MASK

MODE: MODE M1; MASK TAKEUP RATIO: 0 %

FIG. 7A

MODE: MODE M2; MASK TAKEUP RATIO: 5 0 %

FIG. 7B

MODE: MODE M3; MASK TAKEUP RATIO: 1 0 0 %

FIG. 7C

FIG.8

IMAGE PICKUP DEVICE WITH IMAGE MASKING

BACKGROUND OF THE INVENTION

1. Field of the Invention

This invention relates to an image pickup device in which a so-called privacy mask is synthesized to an image, obtained on imaging, and the resulting synthesized image is transmitted to an external device.

This application claims priority of Japanese Patent Application No. 2003-338383, filed on Sep. 29, 2003, the entirety of which is incorporated by reference herein.

2. Description of Related Art

For imaging a news program, or preventing theft or the like acts, a monitor camera is frequently used. The monitor camera, installed on an image pickup site and kept there for a prolonged time, continuously images a subject for imaging, thereby enabling the status of the subject or the progress of the statuses to be observed in realtime. In addition, the image data, obtained on imaging, may be sequentially recorded on a preset recording medium for use for post-analyses.

If, in imaging a subject of interest by a monitor camera, if there is an article possibly infringing the privacy, such as a placard of a company or a window of the residence, referred to below as a private subject, in a near-by area, it is necessary to avoid imaging the subject of interest and the private subject simultaneously (see for example the Patent Publication 1). In EU nations, the imaging of such private subject is prohibited by law.

Thus, in imaging a subject with a monitor camera, mounted in position, there has so far been proposed a monitor camera device, having a privacy mask function, capable of locally screening an output image surface, obtained from image data of the monitor camera, with a view to avoiding the imaging of the private subject at the same time (see for example Patent Publication 1).

[Patent Publication 1] Japanese Laid-Open Patent Publication 2001-69494

In this conventional monitor camera device, having the privacy masking function, it is necessary to make the pickup image angle variable freely, as in a usual camera device, in order to enable zoom-up imaging for a specified object or monitoring of a broad range of the surrounding situation.

If, in such case, the broad-range imaging is to be executed by progressively enlarging the pickup image angle, the size of the privacy mask, displayed on the output image surface, needs to be decreased correspondingly. In similar manner, if the pickup image angle is progressively narrowed for zooming up a desired area, the privacy mask, displayed on the output image surface needs to be correspondingly increased in size. In case the privacy mask is displayed on the entire output image surface, especially in zoom-up, the image recording operation is unnecessary to perform on the side of the image recording device which records the image picked up by the monitor camera device.

However, the conventional monitor camera device suffers from a problem that, since the information pertinent to the size of the privacy mask, changed in dependence upon the pickup image angle, cannot be acquired on the side of the image recording device, the image recording operation which is unnecessary to perform on the side of the image recording device, is executed, especially during zoom-up.

On the other hand, it has so far been desired to achieve serial communication with the takeup ratio of the privacy mask in the output image surface as one parameter on the side of the image recording device.

SUMMARY OF THE INVENTION

In view of the above-epicted status of the art, it is an object of the present invention to provide an image pickup device capable of transmitting an image obtained on imaging, in association with the information pertinent to the privacy mask, designed to shield the image obtained on imaging, to an external device.

For accomplishing the above object, the present inventors have arrived at an image pickup device in which a shield image area for shielding an image of an imaged object on an output image surface is generated based on a control signal transmitted from an external device, the shield image area is synthesized to the image of the object so that the shield image area is prioritized, and in which the so synthesized image is transmitted to the external device in association with the information pertinent to the shield image area.

More specifically, an image pickup device according to the present invention comprises image pickup means for converting an image of an object into image signals for obtaining the image signals, mask area signal generating means for generating signals of a mask area for masking, on a display image surface, of the image signals obtained by the image pickup means, based on a control signal transmitted from an external device, image signal synthesizing means for synthesizing the mask area signals to the image signals for the object so that the mask area signals are prioritized, and transmission control means for associating the image signals synthesized by the image signal synthesizing means with the information pertinent to the mask area for transmission to the external device.

With the image pickup device, according to the present invention, a shielding image area for shielding an image of an object on an output image surface is generated based on a control signal transmitted from the external device, the shielding image area is synthesized to the image of the object so that the shielding image area is prioritized over the image of the object, and the so synthesized image is transmitted to the external device in association with the shielding image area. In this manner, the information pertinent to the shielding image area, as changed responsive to the pickup image angle, may be acquired, to avoid the execution of the unneeded image recording operation in dependence upon the controlled pickup image angle.

DESCRIPTION OF THE PREFERRED EMBODIMENTS

Referring now to the drawings, certain preferred embodiments of the present invention are explained in detail.

Figure 1:
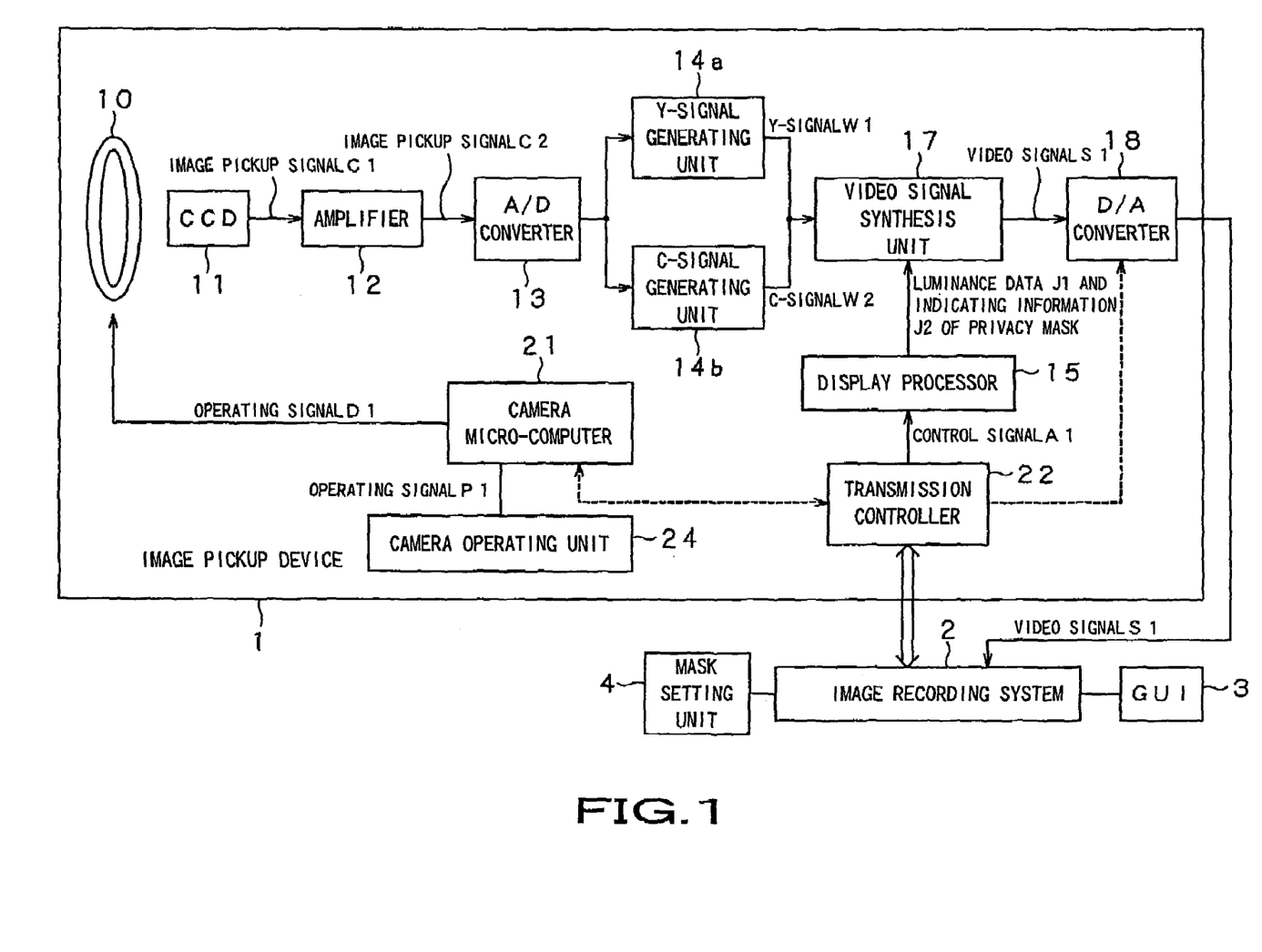
FIG. 1 shows an illustrative structure of an image pickup device embodying the present invention.

The present invention is applied to for example an image pickup device 1 shown in FIG. 1. In imaging a subject, the present image pickup device 1 sets a privacy mask, capable of locally screening an output image obtained from image data of a monitor camera, for avoiding simultaneous imaging of a subject possibly infringing the privacy, such as a placard of a company or a window of a residence, referred to below as a private subject.

The present image pickup device 1 includes an image pickup unit 10 for imaging an object, a CCD (charge-coupled device) 11 for generating image pickup signals C1 based on an object image entered from the image pickup unit 10, an amplifier 12 for amplifying the image pickup signals C1, generated by the CCD 11, and an A/D converter 13 for analog/digital converting image pickup signals C2, supplied from the amplifier 12. The present image pickup device 1 also includes Y-signal generating unit 14a and a C-signal generating unit 14b, both connected to the A/D converter 13, a display processor 15 for generating luminance components of a privacy mask, in keeping with a transmitted control signal A1, a video signal synthesis unit 17 for synthesizing signal components from the Y-signal generating unit 14a and the C-signal generating unit 14b and signal components from the display processor 15, and a D/A converter 18 for digital/analog converting a video signal S1 supplied from the video signal synthesis unit 17 for outputting the converted signal to a downstream side image recording system 2.

The image pickup device 1 further includes at least a camera micro-computer 21 for adjusting at least a pickup image angle and an image pickup direction in the image pickup unit 10, a transmission controller 22 for transmitting the control signal A1 to the display processor 15 or transmitting/receiving the various information to or from the image recording system 2, in keeping with the operations carried out by the camera micro-computer 21, and a camera operating unit 24 connected to the camera micro-computer 21 for a user to perform free adjustment of the pickup image angle or the image pickup direction in the image pickup unit 10.

The above-described image recording system 2 is connected to the image pickup device 1 over a cable which is based on e.g. an RS-232C/424A transmission system, and includes a function of recording video signals S1 transmitted via D/A converter 18 in the image pickup device 1. To this image recording system 2 are connected a GUI (graphical user interface) 3 for displaying an image corresponding to the video signal S1 on an output image display surface, and a mask setting unit 4, composed e.g. of a keyboard or a mouse, for the user to set privacy mask(s) in a desired area as he/she views the object image displayed on the GUI.

The image pickup unit 10 performs automatic iris control operations or automatic focus control operations, based on an operation signal D1 supplied from the camera micro-computer 21. The image pickup unit 10 adjusts the vertical image angle and the horizontal image angle, based on the operation signal D1, while changing the image pickup direction via a pan-tilt unit, not shown. An optical image of the object, as picked up by the image pickup unit 10, is directly incident on the CCD 11. This CCD 11 generates the image pickup signals C1, corresponding to the object image, which is incident via image pickup unit 10, and which has been converted into electrical signals. The image pickup signals C1 are output to the amplifier 12.

The amplifier 12 performs the operation of sample-holding the image pickup signals, output from the CCD 11, by way of performing timing processing, the processing of amplifying the gain of the image pickup signals or the processing of removing the sample-based offset components. The A/D converter 13 analog/digital converts the image pickup signals, supplied from the amplifier 12, to output the resulting signals to the Y-signal generating unit 14a and the C-signal generating unit 14b.

The Y-signal generating unit 14a generates luminance signals (Y signals) W1, representing the luminance, based on the input image pickup signals. The Y-signal generating unit 14a transmits the generated Y signals W1 to the video signal synthesis unit 17.

The C-signal generating unit 14b generates color signals (C signals) W2, representing the color hues, based on the input image pickup signals. The C-signal generating unit 14b transmits the generated C signals W2 to the video signal synthesis unit 17.

The display processor 15 is responsive to the control signal A1, transmitted from the transmission controller 22, to generate luminance data J1 of the privacy mask. The display processor 15 is responsive to the control signal A1 to generate the indicating information, representing the position of the privacy mask in an output image surface area. This indicating information may be of any sort provided that it indicates the position of the privacy mask on the output image surface, and may, for example, be grid lines arrayed in the horizontal direction or in the vertical direction on the output image surface. Instead of the grid lines, the coordinates of mouse cursor positions for setting the privacy masks may be displayed on the image surface. The display processor 15 transmits the luminance data J1 of the privacy mask generated, and the indicating information J2 therefor, to the video signal synthesis unit 17.

The video signal synthesis unit 17 synthesizes the luminance data J1 and/or the indicating information J2 for the privacy masks, entered from the display processor 15, to the Y signals W1 and C signals W2, transmitted respectively from the Y-signal generating unit 14a and the C-signal generating unit 14b, so that priority is placed on the luminance data J1 and/or the indicating information J2 for the privacy masks, to generate video signals, which are then sent to the D/A converter 18. The video signals S1, supplied to the D/A converter 18, are converted into analog signals and transmitted to the image recording system 2.

The camera micro-computer 21 is central processing unit (CPU) for controlling the image pickup device 1 in its entirety, and is connected over a data bus, not shown, to e.g. a ROM in which to store a control program to be executed, or a DRAM, as a work area used for storage or extension. This camera micro-computer 21 is responsive to an operating signal P1 supplied from the camera operating unit 24 or to a command from the transmission controller 22 to generate an operating signal D1 to transmit these signals to the image pickup unit 10. In case a mode of imaging an object, as the image pickup direction or the image pickup angle is automatically controlled in the image pickup device 1, is to be loaded on the image pickup device 1, the operating signal D1 may be generated in no other than the camera micro-computer 21.

By transmitting the control signal A1 to the display processor 15, as described above, the transmission controller 22 not only controls the imaging processing for the privacy mask in its entirety, but also transmits the information pertinent to the privacy mask in its entirety to the image recording system 2, based on a request from the image recording system 2. This transmission controller 22 also controls transmission of the video signal S1 from the D/A converter 18 to the image recording system 2. The transmission controller 22 may transmit the video signal S1 to the image recording system 2 at an optional timing in correlation with the information pertinent to the privacy mask.

The object image, picked up by the above-described image pickup device 1, is converted by the CCD 11 into electrical signals to become the image pickup signals C1 which are amplified by the amplifier 12 to become the image pickup signals C2. These image pickup signals C2 are further analog-to-digital converted by the A/D converter 13. After Y/C separation, the signals are synthesized in a video signal generating unit 17 and digital-to-analog converted so as to be then transmitted to the image recording system 2. The image recording system 2 records these video signals for display on a GUI 3. The user is able to view the object image, displayed on the GUI 13, to monitor the image pickup area by the image pickup device 1 at all times.

In case the user has recognized the presence of a private subject in the image displayed on the GUI 13, the location of such private subject is discriminated, based on the indicating information J2, simultaneously displayed on the GUI 13. In case the luminance data J1 is formed by e.g. the grid lines, the user is able to identify the location of the private subject readily from the coordinates represented by the grid lines.

Figure 2A:
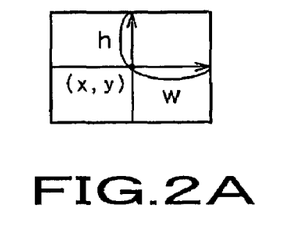
FIG. 2 shows an example of setting the command information and a privacy mask on an output image surface.

If the user is desirous to set the privacy mask for such private subject, the user is able to do this through the mask setting unit 4 as he/she views the GUI 13. In setting this private mask, the user may enter center coordinates (x, y) and then enter the width (w) and the height (h), as shown for example in FIG. 2A.

The privacy mask setting information, thus entered, is transmitted from the mask setting unit 4 to the image recording system 2, and thence to the transmission controller 22 of the image pickup device 1 over a cable of serial communication based on e.g. the RS-232 transmission system. The transmission controller 22 generates the control signal A1, conforming to the privacy mask setting information, to send the so generated control signal to the display processor 15. Based on the control signal A1, the display processor 15 generates the luminance data J1 and the indicating information J2 for the privacy mask.

Figure 2B:
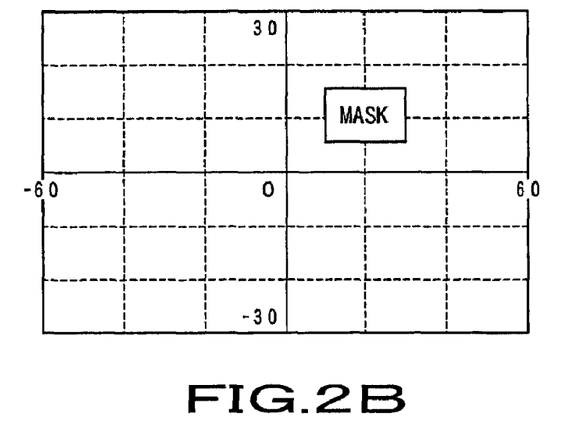

The so generated luminance data J1 and the indicating information J2 for the privacy mask are synthesized together, as shown in FIG. 2B, and transmitted to the video signal synthesis unit 17. In this video signal synthesis unit 17, the luminance data J1 and the indicating information J2 for the privacy mask are synthesized to the Y signal W1 and the C signal W2, so that the luminance data J1 and the indicating information J2 are displayed in preference to the Y signal W1 and the C signal W2. In this manner, the privacy mask is preferred over the Y signal W1 and the C signal W2, and hence the video signal S1, which has completely shielded the private subject, may be created within the image pickup device 1. Moreover, since the indicating information J2 may be displayed in preference to the Y signal W1 and the C signal W2, the indicating information may be displayed in superposition on the respective subjects on the GUI 13, whereby the user is able to grasp the relative positions of the privacy masks responsive to the indicating information and to perform fine adjustment responsive to the indicating information.

Figure 3:
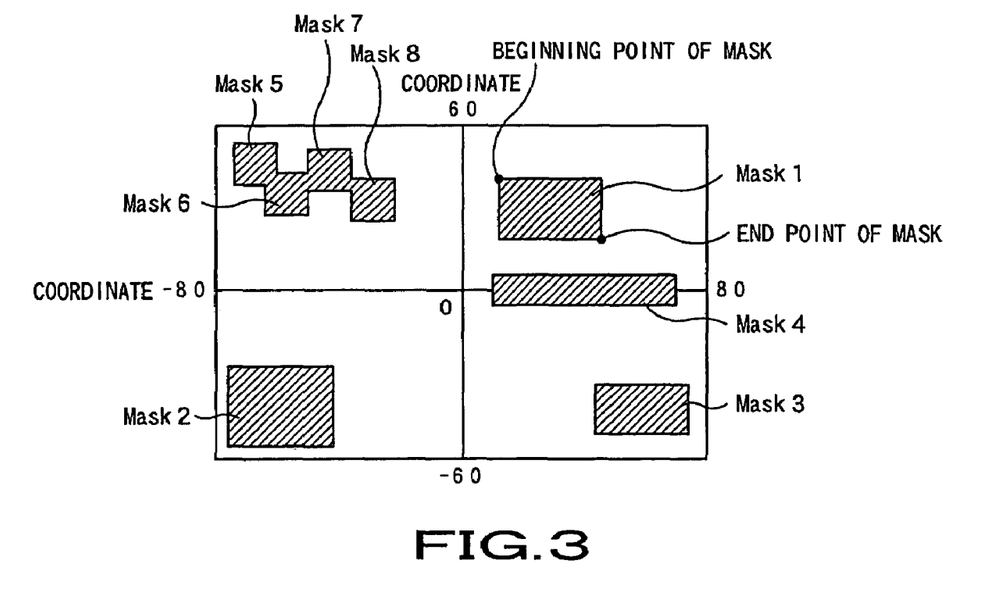
FIG. 3 illustrates a case where eight privacy masks from Mask 1 to Mask 8 have been set on a GUI output image surface.

With the present image pickup device 1, up to the maximum of eight of the privacy masks may be set. FIG. 3 shows an example in which eight privacy masks form Mask 1 to Mask 8 have been set on the display image surface of the GUI 13. If the user is desirous to set the privacy mask on the display image surface of the GUI 13, the user may sequentially click two points, that is, a beginning point and an end point, on the display image surface of the GUI 13, using a mouse, as the mask setting unit 4. In case an output image on the GUI 13 may be displayed by coordinates, as shown in FIG. 3, the user may also directly enter the coordinates by a keyboard as the mask setting unit 4.

Figure 4:
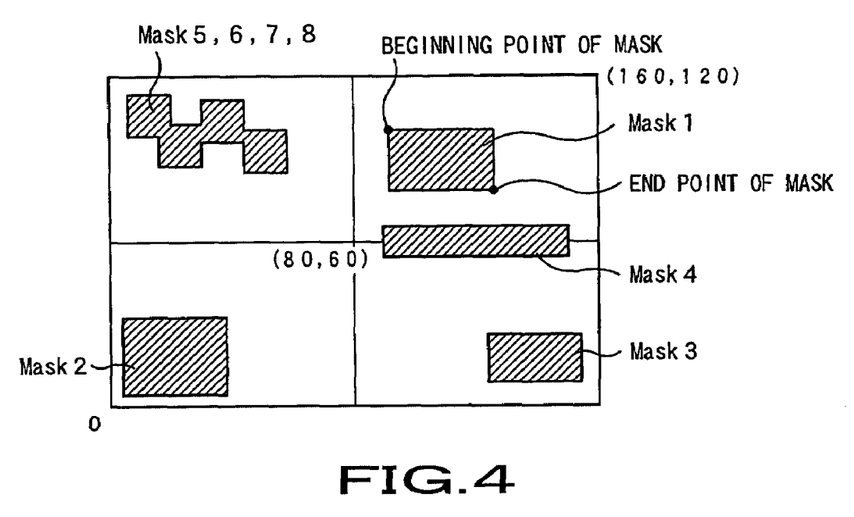
FIG. 4 illustrates a case where an output image is indicated all by positive coordinates.

In case the output image on the GUI 13 may be demonstrated by coordinates, and there exist negative coordinates, these negative coordinates may be shifted such that the output image in its entirety may be indicated by positive coordinates, as shown in FIG. 4. In the example of the output image surface, shown in FIG. 4, the respective coordinates in the output image surface of FIG. 3 have been shifted by +80 pixels in the horizontal direction and +60 pixels in the vertical direction.

Figure 5:
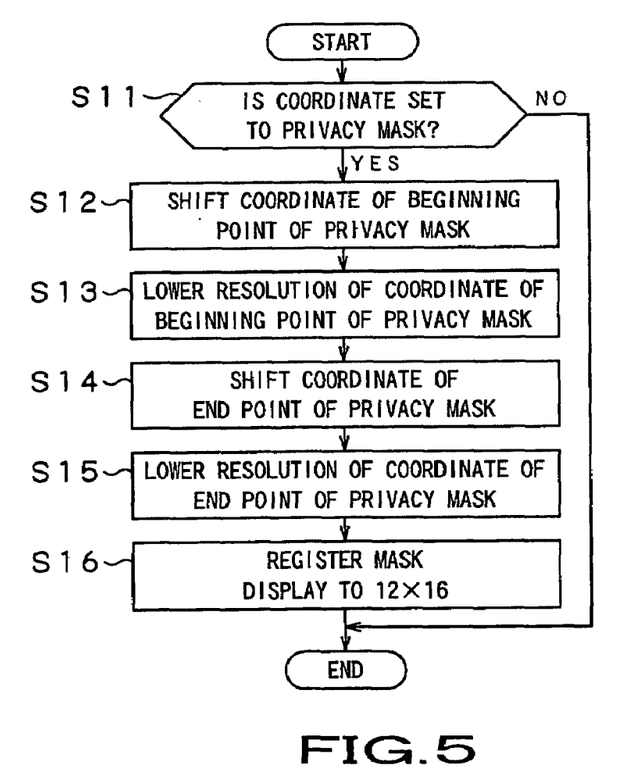
FIG. 5 is a flowchart for illustrating a sequence of coordinate shifting operations.

The coordinate shift may be carried out based on the sequence shown in FIG. 5.

First, in a step ST11, the image recording system 2 checks to see whether or not the coordinates have been allocated to the respective privacy masks on the output image surface of the GUI 13. If, as a result of the check, it is verified that the coordinates have been allocated to the respective privacy masks by the image recording system 2, processing transfers to a step ST12. If conversely it is verified that the coordinates have not been allocated to the respective privacy masks by the image recording system 2, processing shown in FIG. 5 is terminated.

If processing has transferred to the step ST12, only the coordinate of the beginning point of each privacy mask is shifted so as to allocate only the positive coordinates. Then, processing transfers to a step ST13.

In this step ST13, the image recording system 2 degrades the resolution to $\frac{1}{10}$ for the coordinate of the beginning point of the privacy mask. If, under the coordinate system, shifted in the step ST12, the coordinates are allocated to the respective pixels, an array of 120×160=19200 of pixels and hence 19200 memory cells are needed. For this reason, the resolution is degraded to $\frac{1}{10}$, for shifting the coordinates with the necessary minimum number in the array to constitute the memory by 12×16=192 cells.

Then, processing transfers to a step ST14, where the image recording system 2 shifts the coordinates of the end point of each privacy mask to allocate only the positive coordinates. Then, processing transfers to a step ST15.

In this step ST15, the image recording system 2 degrades the resolution to $\frac{1}{10}$ for the coordinate of the end point of the privacy mask. Meanwhile, the processing in the steps ST13 and ST15 may be omitted, if so desired.

Then, processing transfers to a step ST16, where only positive coordinates are allocated to the remaining pixels, making up the privacy mask, based on the coordinates of the beginning and end points of the privacy mask, allocated in terms of the positive coordinate system. In case the coordinates are lowered in resolution in the steps S13 and S15, the coordinate allocation in the step S16 may directly be applied to the low resolution coordinates.

In this step ST16, mask display registration is made for each coordinate. In this mask display registration, the values of "1" are displayed and registered for the coordinates forming the privacy mask, while the values of "0" are displayed and registered for the remaining coordinates. As for the image area in the Mask 5 to Mask 8, overlapping with the privacy masks, the logical sum is taken between the privacy masks and the value "1" to be displayed and registered for coordinates.

By allocating all of the coordinates on the output image surface on the GUI 13 as positive coordinates, the value of "1"

may be displayed and registered for those coordinates forming the privacy mask, whilst the value of "0" may readily be displayed and registered for the remaining coordinates, in a manner convenient for generation of the luminance data J1 of the privacy mask in the display processor 15.

If, in the image pickup device 1 of the present invention, imaging over a broad range is to be realized by progressively increasing the pickup image angle, the privacy mask, displayed on the output image surface, may progressively be reduced in size in a concerted fashion. Similarly, if the pickup image angle is progressively narrowed for zoom-up for a desired area, the privacy mask, displayed on the output image surface, may progressively be enlarged in size in a concerted fashion.

Figure 6A:
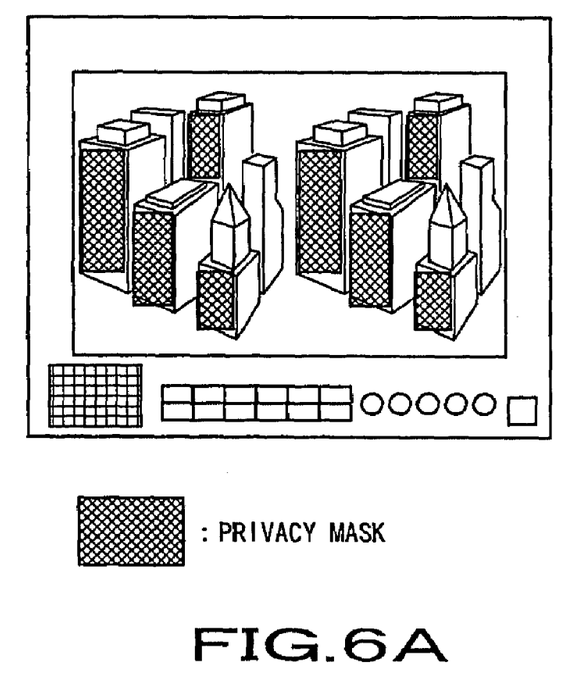
FIG. 6 shows an example of zooming up a privacy mask in keeping with enlargement of a pickup image angle.
Figure 6B:
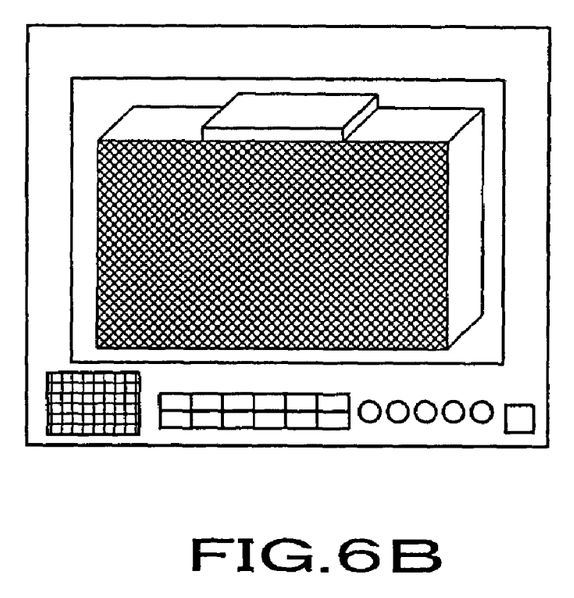

FIG. 6 shows an example of zooming up the privacy mask in keeping with the increase in the pickup image angle. For example, if the privacy mask is set for a desired image area, as shown in FIG. 6A, and an area indicated by a circle is zoomed up, the size of the privacy mask displayed may correspondingly be enlarged, as shown in FIG. 6B.

That is, in this image pickup device 1, the camera microcomputer 21, controlling the zooming up and zooming down by controlling the pickup image angle, and the transmission controller 22, controlling the privacy mask size, may operate in a concerted fashion, so that, on receipt of the operating signal P1 via camera operating unit 24, the camera microcomputer 21 sends a corresponding operating signal D1 to the image pickup unit 10, while notifying the transmission controller 22 of that effect. On receipt of the notification, the transmission controller 22 transmits the control signal A1, for changing the privacy mask size, to the display processor 15. In this manner, the video signal S1, which is the synthesis of the zoom-up image from the image pickup unit 10 and luminance data of the enlarged privacy mask, transmitted from the display processor 15, may be generated, and hence the above-described output image surface shown in FIG. 6(*b*) may be formed.

The transmission controller 22 transmits the information pertinent to the privacy mask to the image recording system 2 in association with the transmission of the video signal S1. In case the size of the privacy mask has been changed, based on the notification from the camera microcomputer 21, the transmission controller 15 may transmit the information pertinent to the privacy mask size to the image recording system 2. The information transmitted may be of any configuration. For example, the information transmitted may be the correlation of the size of the privacy mask to the pickup image angle, controlled by the camera micro-computer 21, or the proportion of the size of the privacy mask to the entire output image surface (referred to below as the mask take-up ratio).

The image recording system 2, which has received the video signal S1 and the information pertinent to the video signal, is able to execute the corresponding image recording processing. In case it has been recognized, from the information pertinent to the mask takeup ratio, received from the image pickup device 1, that the privacy mask has been set for almost the totality of the output image surface, the image pickup device 1 is able to halt the image recording processing. This evades the execution of unneeded recording operations especially in zoom-up.

The image recording system 2 may incidentally inquire the image pickup device 1 of the information pertinent to the mask takeup ratio. On receipt of this enquiry, the image pickup device first discriminates the mask takeup ratio and subsequently discriminates the mode responsive to the so discriminated mask takeup ratio. The modes discriminated here include a mode 1 for the mask takeup ratio of 0%, a mode 2 for the mask takeup ratio less than 80%, and a mode 1 for the mask takeup ratio not less than 80%.

Figure 7A:
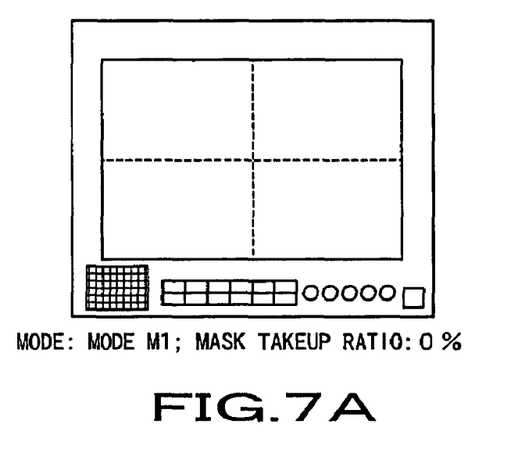
FIG. 7 illustrates the relationship of the mode with respect to the mask takeup ratio as discriminated.
Figure 7B:
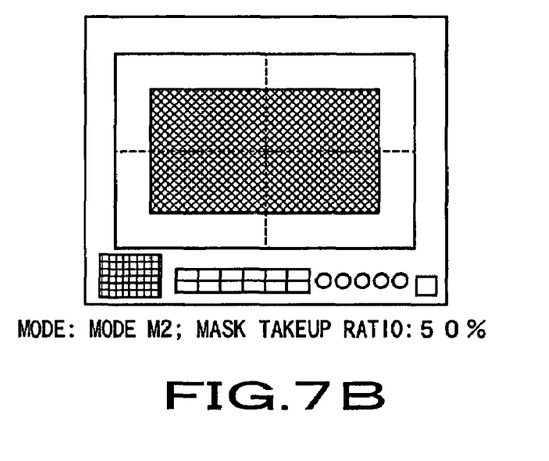
Figure 7C:
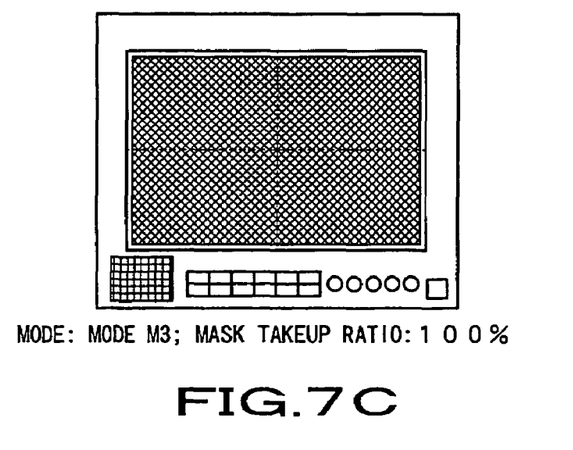

For example, if there is no privacy mask on the output image surface, as shown in FIG. 7A, the mode is the mode M1. If the mask takeup ratio as discriminated is 50%, as shown in FIG. 7B, the mode is the mode M2 and, if the mask takeup ratio as discriminated is 100%, as shown in FIG. 7C, the mode is the mode M3. The image pickup device 1 sends the modes discriminated by serial communication to the image recording system 2.

In transmitting the modes discriminated to the image recording system 2, the image recording system 2 may transmit "High" and "Low" electrical signals for the mode 3 and for both the modes 1 and 2, respectively. Moreover, in transmitting the modes discriminated to the image recording system 2, the image recording system 2 may transmit commands by serial communication simultaneously. In such serial communication, the commands may be transmitted only on the occasion of switching from "High" to "Low" of from "Low" to "High".

Figure 8:
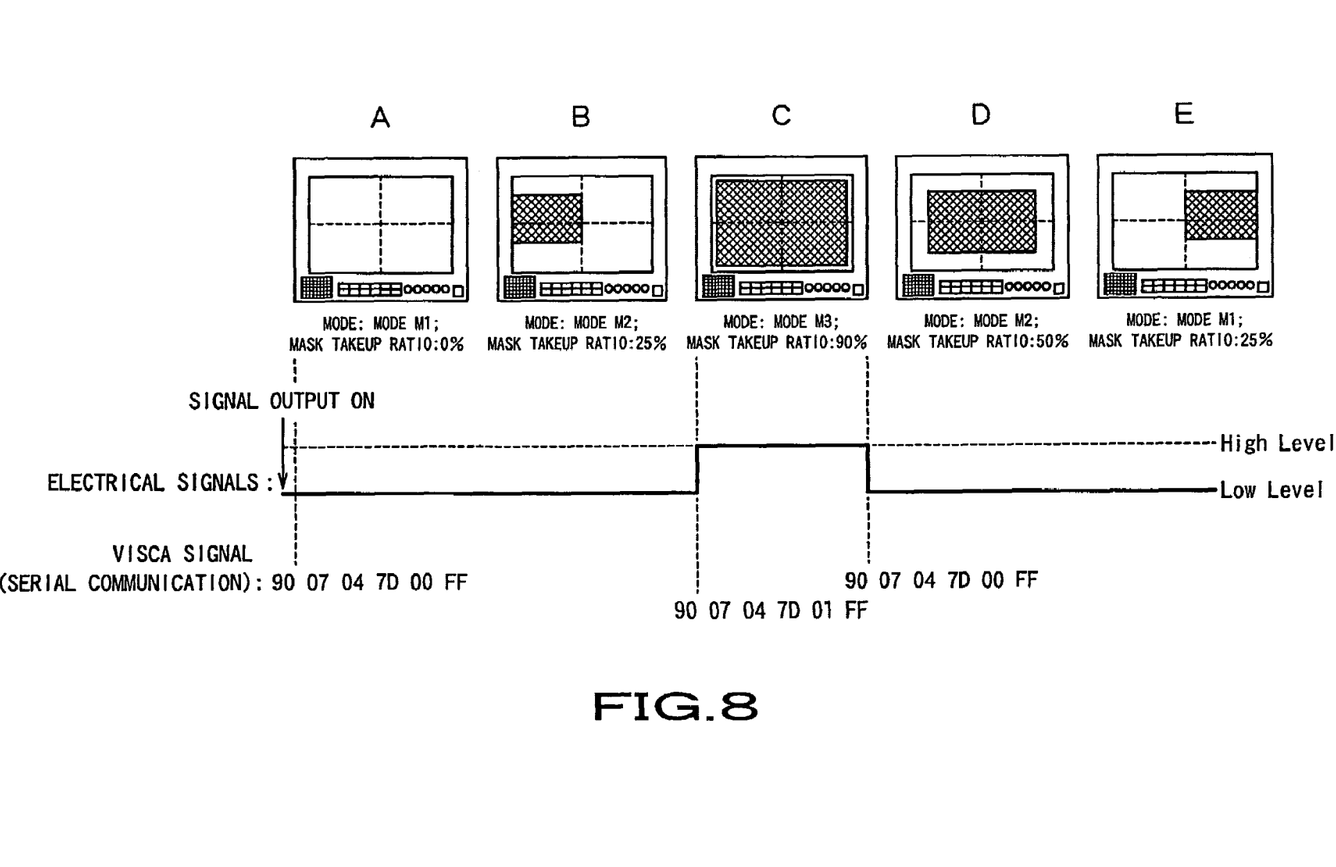
FIG. 8 illustrates a case of employing a VISCA signal in serial communication.

FIG. 8 shows an example of employing a VISCA (video system control architecture) signal in such serial communication. The VISCA signal means a protocol for interconnecting the respective terminals under e.g. the RS-232C/424A transmission system for signals by the serial communication.

Referring to FIG. 8, for the output image A where there is no privacy mask, the mode is M1, with the electrical signals being "Low". In the serial communication, "90 07 04 7D 00 FF" is transmitted as the VISCA signal indicating the change of the electrical signals to "Low".

In case a signal is output for the output image surface B with the mask takeup ratio of 25%, the electrical signals "Low" corresponding to the discriminated mode M2 are transmitted to the image recording system 2. It is noted that the electrical signals remain to be "Low" in switching from the output image A to the output image B, so that no VISCA signals are transmitted.

In case a signal is output for the output image surface C with the mask takeup ratio of 90%, the electrical signals "High" corresponding to the discriminated mode M3 are transmitted to the image recording system 2. The electrical signals are changed from "Low" to "High", in switching from the output image B to the output image C, and hence "90 07 04 7D 01 FF" is output as the VISCA signal indicating that effect.

In case a signal is output for the output image surface D with the mask takeup ratio of 50%, the electrical signals "Low" corresponding to the discriminated mode M2 are transmitted to the image recording system 2. The electrical signals are changed from "High" to "Low", in switching from the output image C to the output image D, and hence "90 07 04 7D 00 FF" is transmitted as VISCA signal indicating that effect.

In case a signal is output for the output image surface B with the mask takeup ratio of 25%, the. electrical signals "Low" corresponding to the discriminated mode M2 are transmitted to the image recording system 2. Meanwhile, the electrical signals from the output image surface D to the output image surface E remain "Low" and hence no VISCA signals are transmitted.

Thus, by verifying whether or not the electrical signals transmitted from the image pickup device 1 are equal to or larger than a preset threshold value, and by transmitting the verified result as the VISCA signal to the image recording system 2, it is possible to realize the serial communication with the privacy mask takeup ratio in the output image surface as a parameter. Hence, the image recording system 2 is able to carry out various processing operations in association with the VISCA signals transmitted. It is of course possible to acquire the position information of the respective privacy masks, based on the VISCA signals, thus obtained, to display the acquired position information of the respective privacy masks on the GUI 13.

What is claimed is:

1. An image pickup device comprising
image pickup means for converting an image of an object into image signals for obtaining the image signals;
mask area signal generating means for generating mask area signals to be masked on a display image surface of said image signals obtained by said image pickup means, based on a control signal transmitted from an external device;
image signal synthesizing means for synthesizing said mask area signals to said image signals for said object so that said mask area signals are prioritized; and
transmission control means for associating the image signals synthesized by said image signal synthesizing means with information pertinent to said mask area and for transmitting the resulting image signals-mask area information to said external device,
wherein the information pertinent to said mask area is a takeup ratio of said mask area on said display image surface.

2. The image pickup device according to claim 1 further comprising
image pickup control means for controlling a pickup image angle in said image pickup means;
said mask area signal generating means changing the size of said mask area in dependence upon the pickup image angle controlled by said image pickup control means;
said transmission control means attaching importance to the correlation of the size of the mask area to the pickup image angle.

3. An image pickup device comprising image pickup means for converting an image of an object into image signals for obtaining the image signals;
mask area signal generating means for generating mask area signals to be masked on a display image surface of said image signals obtained by said image pickup means, based on a control signal transmitted from an external device;
image signal synthesizing means for synthesizing said mask area signals to said image signals for said object so that said mask area signals are prioritized; and
transmission control means for associating the image signals synthesized by said image signal synthesizing means with information pertinent to said mask area and for transmitting the resulting image signals-mask area information to said external device,
wherein said transmission control means verifies whether or not a takeup ratio of said mask area on said display image surface is equal to or larger than a preset threshold value and sends verified results to the external device.

4. The image pickup device according to claim 3 wherein said verified results represent the information used for said external device controlling the halting or non-halting of an image recording operation.

5. An image pickup device comprising
an image pickup unit configured to convert an image of an object into image signals to obtain the image signals;
a mask area signal generating unit configured to generate mask area signals to be masked on a display image surface of said image signals obtained by said image pickup unit, based on a control signal transmitted from an external device;
an image signal synthesizing unit configured to synthesize said mask area signals to said image signals for said object so that said mask area signals are prioritized; and
a transmission control unit configured to associate the image signals synthesized by said image signal synthesizing unit with information pertinent to said mask area and to transmit the resulting image signals-mask area information to said external device,
wherein the information pertinent to said mask area is a takeup ratio of said mask area on said display image surface.

6. An image pickup device comprising
an image pickup unit configured to convert an image of an object into image signals to obtain the image signals;
a mask area signal generating unit configured to generate mask area signals to be masked on a display image surface of said image signals obtained by said image pickup unit, based on a control signal transmitted from an external device;
an image signal synthesizing unit configured to synthesize said mask area signals to said image signals for said object so that said mask area signals are prioritized;
a transmission control unit configured to associate the image signals synthesized by said image signal synthesizing unit with information pertinent to said mask area and to transmit the resulting image signals-mask area information to said external device; and
a controller configured to verify whether or not a takeup ratio of the mask area on said display image surface is equal to or larger than a preset threshold value;
wherein said transmission control unit transmits verified results of said controller to an image recording device, and said image recording device is a device halting or not halting a recording processing based on said verified results.

* * * * *